Sept. 22, 1970  R. R. AKERS  3,530,223
ELECTRODE APPARATUS FOR USE IN AN ARC ELECTRODE FURNACE
AND MAGNETIC FIELD COILS FOR MOVING AND FOCUSING
THE ARCS THEREFROM
Filed March 3, 1969  3 Sheets-Sheet 1

INVENTOR
Ronald R. Akers
ATTORNEY

Sept. 22, 1970  R. R. AKERS  3,530,223
ELECTRODE APPARATUS FOR USE IN AN ARC ELECTRODE FURNACE
AND MAGNETIC FIELD COILS FOR MOVING AND FOCUSING
THE ARCS THEREFROM Filed March 3, 1969  3 Sheets-Sheet 3

United States Patent Office 3,530,223
Patented Sept. 22, 1970

---

3,530,223
ELECTRODE APPARATUS FOR USE IN AN ARC ELECTRODE FURNACE AND MAGNETIC FIELD COILS FOR MOVING AND FOCUSING THE ARCS THEREFROM
Ronald R. Akers, Pittsburgh, Pa., assignor to Westinghouse Electric Corporation, Pittsburgh, Pa., a corporation of Pennsylvania
Continuation-in-part of application Ser. No. 565,464, July 15, 1966. This application Mar. 3, 1969, Ser. No. 803,656
Int. Cl. H05b 7/06
U.S. Cl. 13—18
18 Claims

ABSTRACT OF THE DISCLOSURE

A furnace which may be three phase has electrode supporting and positioning apparatus for carboniferous electrodes and means for mounting and adjusting the positions of fluid cooled magnetic field coils located near the arcing surfaces for producing magnetic fields which move the arcs around the electrodes and prevent uneven wear which would produce arc flare, and focus the arcs from the electrodes in an axial direction thereby further reducing arc flare. The field coils may be lifted toward the top of the furnace during scrap melt down when arc flare to the scrap is desirable.

---

CROSS REFERENCE TO RELATED APPLICATIONS

This application is a continuation-in-part of Ser. No. 565,464, filed July 15, 1966.

BACKGROUND OF THE INVENTION

Field of the invention

This invention relates to improvements in electrodes and the like, and more particularly to an improved electrode having an extended portion composed of a selected substance, for example, a carboniferous material, for example graphite, and having a field coil for rotating the arc therefrom, especially suitable for use in electric arc furnaces at atmospheric pressure, and electrode and field coil mounting and position adjusting means.

Description of the prior art

The use of a magnetic field producing coil to rotate the arc on an electrode arcing surface is very well known in the art and has been used for many applications. One example is disclosed in Pat. No. 510,777 to C. L. Coffin for "Apparatus for Heating Metals Electrically," issued Dec. 12, 1893. However, most electric arc furnaces today employ graphite electrodes in which no arc rotation is provided and as a result, under steady operating conditions, the electrodes become eroded in such a fashion that a trough, effectively a nozzle, is formed in the end of each electrode, causing the arc to flare toward the furnace walls. The result of this is that the inside walls of the furnaces are subjected to very extreme conditions and have to be replaced quite often at large expense. This trough is generally formed because of the aerodynamic and electromagnetic forces driving the arc away from the center of the furnace chamber toward the wall of the furnace.

SUMMARY OF THE INVENTION

I have overcome this in my invention by providing a field coil which is fluid cooled, which can withstand the intense heat of radiation and convection inside an electric arc furnace, and which has sufficient cooling so that heat flux is transferred away from the coil fast enough to prevent damage to the coil by the intense heat. In one embodiment of my invention, my field coil is mounted on the outside of a solid electrode of graphite or other suitable material and is slidable along the outside wall surface thereof to a selected position, and my invention includes means for holding the field coil in position, and moving the coil to a new position as the graphite or other material is consumed by the rotating arc. In another embodiment of my invention I provide a field coil mounted in the center passageway of a cylindrical electrode of graphite or other suitable material, the last-named coil also being fluid cooled and having means for mounting and securing it at a predetermined position in the electrode and a desired distance from the arcing surface, and adjusting the position as the graphite or other material is consumed.

Accordingly, a primary object of my invention is to provide a new and improved electrode composed of graphite or other material especially suitable for use in an electric arc furnace, at atmospheric pressure and having field coil means for both rotating and focusing the arc.

An additional object is to provide a new and improved nonconsumable heat resistant water cooled field coil for mounting on the outside wall of an electrode to rotate the arc thereof.

An additional object is to provide a field coil having means for removing heat flux therefrom suitable for mounting in the inside passageway of a cylindrical electrode composed of consumable material to rotate the arc.

A further object is to provide furnace apparatus including apparatus for adjusting the positions of the electrodes and separately adjusting the positions of magnetic field coils.

These and other objects will become more clearly apparent after a study of the following specification when read in connection with the accompanying drawings, in which.

Figure 1:
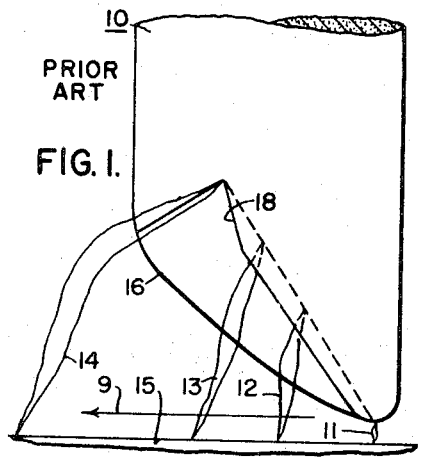
FIG. 1 shows a graphite electrode as employed in the prior art.

Referring now to the drawings for a more detailed understanding of the invention, in which like reference characters are used throughout to designate like parts, and more particularly to FIG. 1 thereof which shows a graphite electrode according to the prior art, the graphite electrode is generally designated 10, and a number of arc positions, which represent the motion of the arc, 11, 12, 13 and 14 are seen, taking place to a surface of opposite polarity 15 which may be the melt of the furnace. It is seen that the arcing surface 16 of the graphite electrode becomes skewed or slanting as a result of the arc therefrom. The aforementioned trough formed in the electrode is clearly visible in FIG. 1, and since the aerodynamic and electromagnetic forces result in driving the arc designated 14 in FIG. 1 toward that portion of the graphite electrode which is adjacent the inside wall of the furnace, nonuniform consumption of the electrode occurs. Arrow 9 designates the general direction of motion of the arc. As further stated hereinbefore, to have the arc from the graphite electrode concentrated in the area near the wall of the furnace ultimately is damaging to the wall of the furnace and may require expensive repairs. Also the arc moving towards the wall carries with it hot gases and other particles which tend to erode and shorten the life of the wall leading to expensive replacement of the walls. Not only that, but the trough 18 formed in the arcing surface of the electrode means that the material of the graphite electrode is not fully used.

Figure 2:
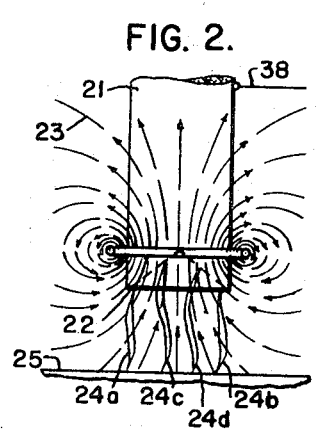
FIG. 2 shows a magnetic field coil according to one embodiment of my invention mounted on the outside wall of a solid electrode of graphite or other suitable material and showing the shape of the arcing surface of the graphite electrode while a magnetic field is employed.

Particular reference is made now to FIG. 2 where apparatus according to one embodiment of my invention is shown. A solid electrode composed of graphite, carbon or a similar material is designated 21 and has disposed therearound near the arcing end thereof a field coil 22 for setting up a magnetic field, the magnetic lines following the direction shown, the field being indicated at 23. An arc 24 takes place from electrode 21 to a melt or other surface of opposite polarity 25. The magnetic field interacting with the arc current sets up a force on the arc which causes the arc to move in a substantially annular path near the outer edge of the electrode and then spiralling inward toward the center of the electrode. The arc tends to locate in the center of the electrode due to the axial field component present at that location. Successive positions of the arc as the arc spirals toward the center of the electrode are indicated at 24a, 24b, 24c and 24d. Where the arc is produced by direct current and the magnetic field is a direct current field, the arc rotates substantially continuously in one angular direction. Where either the magnetic field or the arc is produced by alternating current and the other is produced by direct current, the direction of rotation of the arc will reverse once per alternation. Where both the field and the arc are produced by alternating current from the same source, the arc may rotate substantially continuously in one direction.

As a result of the rotation of the arc produced by my invention of FIG. 2, the arcing surface, or end of the graphite electrode 21, is more uniformly consumed with the result that the electrode has a longer useful life, and also with the result that shutdowns to adjust the axial position of the electrode are reduced, as well as shutdowns to adjust the angular or radial position of the electrode to compensate for a trough such as 18 of FIG. 1.

Figure 3:
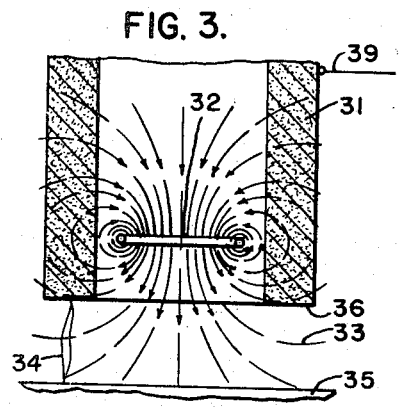
FIG. 3 shows a field coil according to a second embodiment of my invention disposed inside a cylindrical electrode of graphite or other suitable material and showing the shape of the arcing surface of the electrode.

Particular reference is made now to FIG. 3. In FIG. 3, a substantially cylindrical electrode 31 composed of graphite, carbon or such like material has a magnetic field coil 32 disposed therein near the arcing end, sufficiently close to the arcing end 36 of the electrode to set up a magnetic field 33 transverse to the path of the arc 34 which extends from the annular arcing surface 36 to a melt or other surface of opposite polarity 35, the transverse magnetic field 33 causing the arc 34 to rotate substantially continuously around the flat annular arcing surface 36 at the arcing end of electrode 31.

In both the embodiments of FIG. 2 and FIG. 3, the field coil is represented symbolically by a single turn having an axis which substantially coincides with the longitudinal axis of the electrode. It will be understood that field coils 22 and 32 may be of any desired number of turns to produce a magnetizing force of the required number of ampere turns to set up a field of needed strength to rotate the arc at a desired speed in accordance with the arc current, and of a strength sufficient to overcome the fields due to the other electrodes. Lead means, not shown for convenience of illustration, is connected to coil 22 and lead means, not shown for convenience of illustration, is connected to coil 32 for energizing these coils. Lead means 38 and 39 are shown symbolically connected to the electrodes, FIGS. 2 and 3, to bring arc current to the electrodes.

Figure 4:
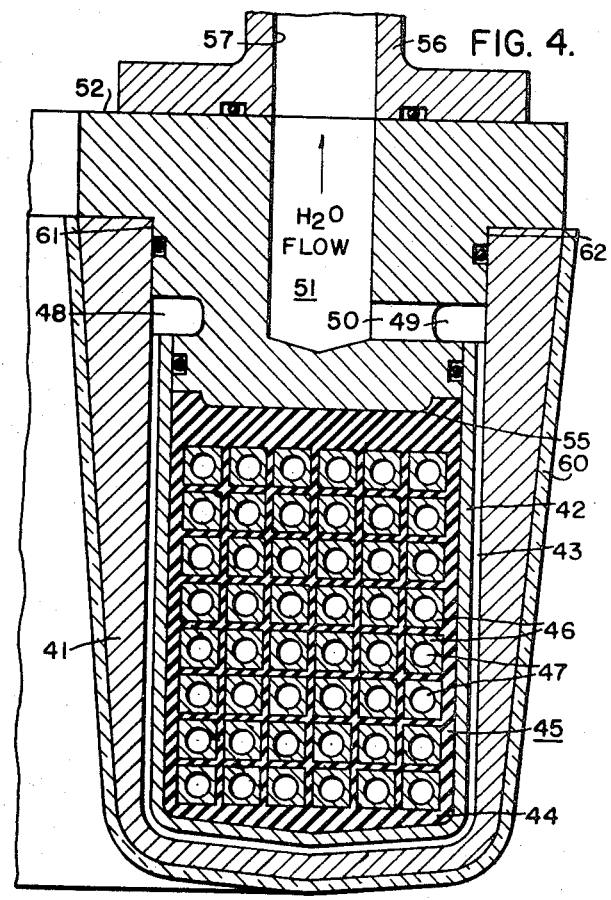
FIG. 4 shows a cross-section through the water cooled magnetic field coil of my invention.

As will become more clearly apparent hereinafter, if the field coils 22 and 23 are not to be destroyed by the intensely hot radiation from the arcs 24 and 34 respectively, as well as by the convection of high temperature gases near the electrode and the melt, it is necessary to fluid cool the coils 22 and 23 to conduct heat flux away from the coils and to maintain a temperature below that at which the coils would be destroyed. In FIG. 4 hereinafter to be described, I have shown a cross-section through a fluid cooled field coil which is substantially nonconsumable and has an unlimited life, provided by fluid conducting heat flux away from the coil at a sufficiently rapid rate.

With further reference to the embodiment of FIG. 3, this configuration may offer some advantages in that the field coil is less subject to adverse conditions such as damage of the coil by attraction of fluid steel to its surface, etc. Also with the coil inside the electrode, the coil may be lowered and raised with the electrode as the electrode is lowered onto the iron of the melt during the initial phases of the melting process, this initial phase being characterized by the arc literally boring into the material and forming a cylindrical hole slightly larger in diameter than the electrode. In FIG. 3, the field coil is somewhat smaller than that shown in FIG. 2, which may be another distinct advantage.

My invention includes the use of a field coil connected in series with the electrode so that the arc current flows through the coil and sets up the necessary magnetic field. As will be readily understood by those skilled in the art, where the relatively heavy current of the arc flows through the coil which creates the arc-moving field, a relatively smaller number of turns is needed to produce the same relative number of ampere turns and substantially the same flux strength.

My invention, according to FIG. 3, includes the use of air under pressure forced down the inside of the electrode between the electrode and the field coil to prevent the accumulation of debris in this area.

Particular reference is made now to FIG. 4, wherein a cross-section through a fluid cooled coil is shown which may be used in either the embodiment of FIG. 2 or the embodiment of FIG. 3. In FIG. 4, a fluid channeling and coil support member 52 composed of nonpermeable material is generally annular in shape and has an annular groove therein on one side thereof, for example, the inside, to form a fluid inlet 48 and an oppositely disposed annular groove on the other side, for example, the outside, this groove being designated 49 and forming a fluid outlet header communicating by way of passageway or bore 50 with a centrally disposed passageway 51. Passageway 51 communicates with the interior bore 57 of an extended support member 56 composed of nonpermeable material, it being understood that the member 56 may extend the entire length of the electrode and, if desired, beyond the upper end of the electrode, the position of the field coil being adjustable by moving the extended support portion 56. As previously stated, the position of the field coil may be desired to be adjusted to more effectively utilize the field in rotation of the arc; adjustment may be necessitated by the consumption of the graphite electrode or by the irregular eating away of the arcing end of the graphite electrode, that is, the irregular eating away before the coil is used with the electrode. Whereas preferably, the coil of my invention is used with a newly inserted electrode having a normal solid end at the arcing end thereof, the coil may be inserted and successfully used on graphite electrodes which have been partially eroded as shown in FIG. 1. The aforementioned member 52 has a lower portion of reduced thickness forming shoulders 61 and 62 which receive a generally U-shaped outside annular member 41 composed of copper or other suitable material having high thermal conductivity. Within the aforementioned U-shaped annular member 41 is disposed a second U-shaped annular member 42 having a plurality of U-shaped grooves 43 at spaced intervals around the periphery thereof providing a large number of peripherally or circumferentially spaced fluid flow passages 43 communicating between the aforementioned fluid inlet 48 and the aforementioned fluid outlet 49, both of which extent around the entire circumference of the coil. This is not to say the U-shaped groove could not be in member 41 or could not be formed by a 3rd member, not shown. Fluid flowing under pressure through this large number of passageways 43 conducts heat flux from the outside copper member 41 up through the passageways 51 and 57 to fluid outlet means, not shown for convenience of illustration. A jacket 60 of electrically insulating material may enclose the member 41. Inside the aforementioned inner annular U-shaped member 42 is a field coil housing 44 composed of electrically insulating material having disposed therein a field coil generally designated 45 having turns 46 composed of, in the example shown, a conductor having a square cross-section with a circular passageway 47 therethrough for the flow of a cooling fluid through the individual turns of the field coil. The two leads for energizing the field coil may be disposed 180° apart and may consist of similar conduit, the leadins to the coil also providing fluid flow passageways to and from the coil. If desired, these leads may extend substantially parallel to passageways 51–57 and the corresponding fluid inlet passageways, not shown, or the leads may extend from the coil and run substantially by themselves to the other end of the coil-supporting structure. Grooves 55 are provided for absorbing torque from the field coil, and as shown O-rings disposed in other grooves are provided where needed to insure an effective fluid tight seal between the various parts of the structure of FIG. 4.

With further reference to the embodiment of FIG. 2, where a field coil is disposed near the end of a solid graphite electrode, initially the arc will tend to operate near the center of the electrode since it is at this point that the magnetic field is most nearly aligned with the current path. Since the graphite is consumable, the path length will increase. Eventually, the electrode will be worn as shown by the dashed lines of FIG. 2 with the arc forming on the exterior of the electrode and moving in a circular fashion toward the center. This mode of operation will greatly reduce the furnace inside wall degradation, since there will not be preferential heating of the side wall as in the case of a graphite electrode without a magnetic field as described in connection with the prior art electrode of FIG. 1.

It is contemplated that the field coil of FIG. 4 will be separately excited from the electrode. The aforementioned shield 60 composed of electrical insulation prevents the arc from passing from the electrode to the field coil.

As previously stated, the invention includes the use of a field coil connected in series with the arcing surface so that the coil is energized by the arcing current. The operation of such a structure is more fully described in a copending patent application to G. A. Kemeny and S. M. De Corso for "Fluid Arc Electrode Having Means for Utilizing the Current Which Produces and Sustains the Arc to Generate a Magnetic Field Which Continuously Moves the Arc in a Closed Path," filed Aug. 27, 1965, Ser. No. 483,111, and assigned to the assignee of the instant invention.

Figure 5:
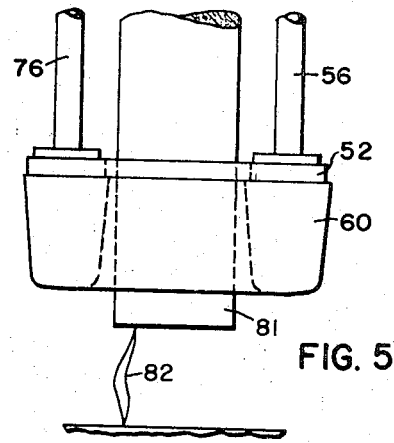
FIG. 5 shows diagrammatically how the field coil is mounted on the electrode.

Particular reference is made now to FIG. 5, which shows a field coil constructed according to FIG. 4 mounted on an electrode 81 having an arc 82, the electrically insulating shield 60 extending around the coil being more completely shown, the annular supporting and fluid channeling member 52 being more fully shown and the extended fluid inlet and supporting member 76 being shown disposed substantially 180° from the aforementioned supporting and fluid outlet passageway forming means 56.

Figure 6:
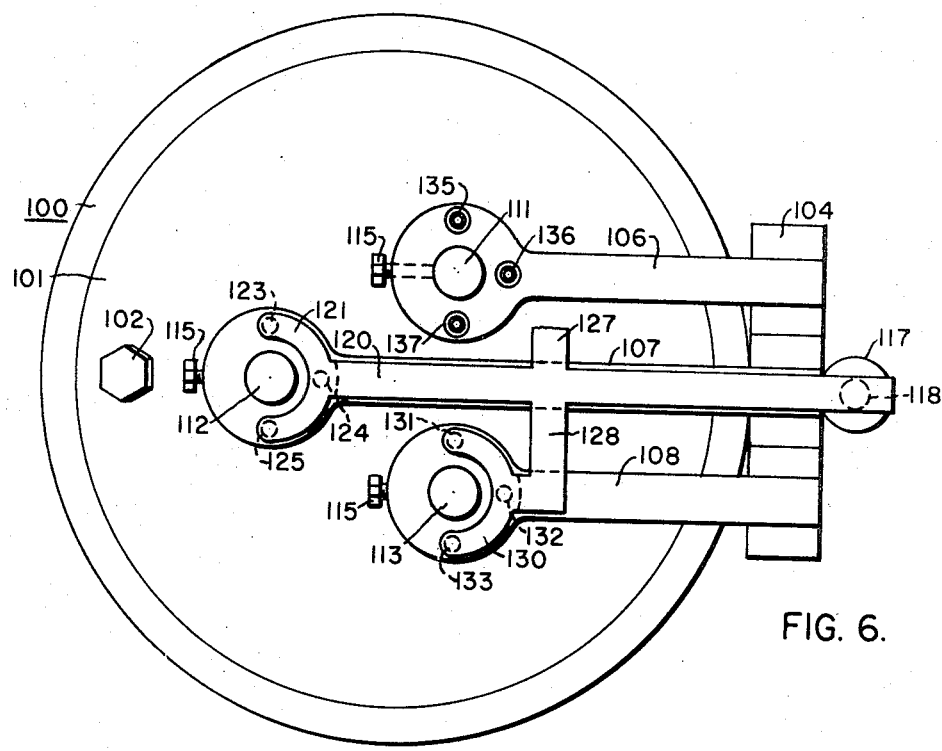
FIG. 6 is a plan view partially broken away of electrode supporting and positioning apparatus and magnetic field coil supporting and positioning apparatus.

Particular reference is made now to FIG. 6. The furnace generally designated 100 has a top 101 with a plug 102 therein which may be removed to insure operation at atmospheric pressure. An electrode support 104 disposed adjacent the furnace has three arms extending therefrom designated 106, 107 and 108 in which are mounted three electrodes of carboniferous material 111, 112 and 113. Any suitable means may be employed for holding the electrodes in position in the respective arms, exemplified by the lock bolts 115. It will be understood that conventional electrode clamping means may be substituted for the bolt shown, and one tube to the field coil, hereinafter to be described, dispersed with.

Disposed outside the furnace adjacent the electrode support 104 is a pressurized cylinder 117 having therein a piston, not shown, with the piston rod or mast 118 having secured thereto an arm 120 terminating in a generally semicircular portion 121 to which are secured three downwardly extending tubes 123, 124 and 125.

The aforementioned arm 120 has two arm extensions 127 and 128 which also terminate in generally semicircular portions, the portion for supporting the field coil of electrode 111 being broken away for clarity of illustration, the semicircular portion of arm extension 128 being shown at 130. Portion 130 is seen to have tubes 131, 132 and 133 extending downwardly therefrom, and tubes 135, 136 and 137 for the field coil for electrode 111 are shown passing through apertures in the electrode support arm 106.

It will be understood that the electrodes 111, 112 and 113 as well as the three tubes supporting each field coil near the arcing surface of the electrode pass through appropriately placed apertures in the top 101 of the furnace, being slidably mounted therein.

Figure 7:
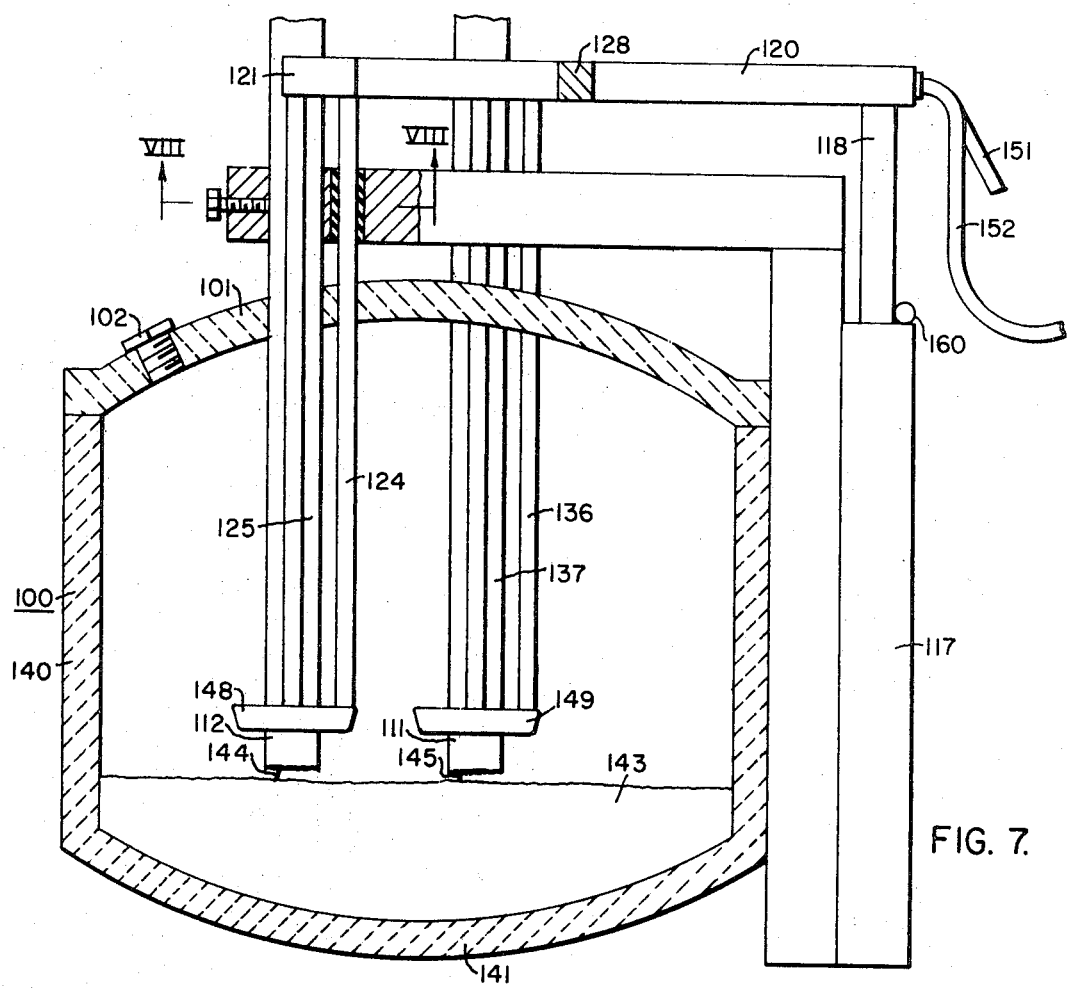
FIG. 7 is a side view partially in section and partially in elevation of electrodes and magnetic field coils disposed in a furnace.

Particular reference is made now to FIG. 7. The top 101, the side wall 140 and the bottom 141 of the furnace generally designated 100 are seen to be composed of refractory material. The melt within the furnace is designated 143 and arcs 144 and 145 are seen taking place between electrodes 112 and 111 respectively to the aforementioned melt 143. The two magnetic field coils for the electrodes 112 and 111 are designated 148 and 149 respectively. As previously stated, the field coils including coils 148 and 149 are fluid cooled by fluid brought into the coil through at least one tube and conducted from the coil by at least another tube. As seen in FIG. 7, flexible hose connections or conduits are shown at 151 and 152 which it is understood are connected to suitable fluid channeling means within the arm 120, means not shown for convenience of illustration, which communicate with the tubes extending from the support arm 120 to the magnetic field coils.

As seen in FIG. 7, the tubes extending from arm 120 to the field coils may if desired pass through refractory or electrically insulating sleeves disposed within apertures in the electrode support arms.

Insulated electrical cables to energize the field coils may pass through the tubes, if desired.

Figure 8:
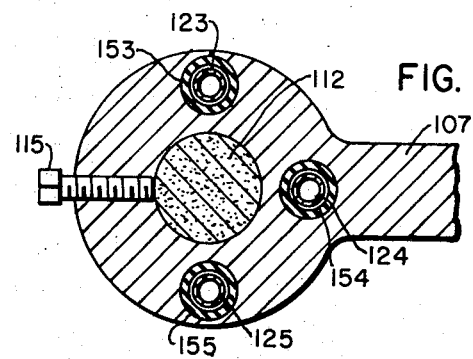
FIG. 8 is a sectional view through the line VIII—VIII of FIG. 7.

Particular reference is made now to FIG. 8, a section along the line VIII—VIII of FIG. 7. Tubes 123, 124 and 125 are seen passing through sleeves 153, 154 and 155 in the electrode holder arm 107 for electrode 112.

Each field coil supporting tubes assembly has sufficient mechanical strength to resist torques resulting from the fields at the other electrodes.

Figure 9:
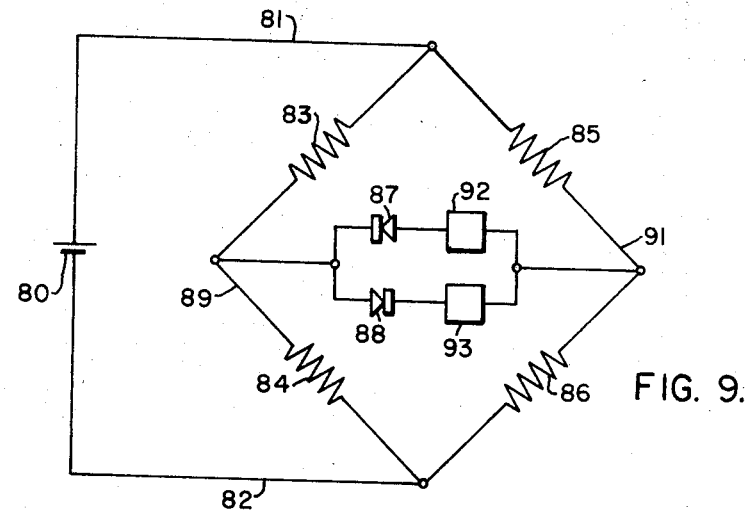
FIG. 9 is a schematic electrical circuit diagram of apparatus for positioning the magnetic field coils.

Particular attention is directed to FIG. 9 which shows a "null" type of servo control system for positioning the magnetic field coils.

A bridge circuit including resistors 83, 84, 85 and 86, two of which are variable, is energized by way of leads 81 and 82 from source of direct current potential 80. The output of the bridge taken across leads 89 and 91 is selectively applied to "Raise" and "Lower" controls 92 and 93 by way of oppositely poled rectifiers 87 and 88. One of the variable resistors is at the furnace control panel and may be a ten turn potentiometer with operatively connected means for indicating field coil position or height; the other variable resistor may be a ten turn potentiometer coupled to the mast 118. Movement of the potentiometer at the control panel causes the mast to be selectively raised or lowered, and the potentiometer coupled to the mast is varied in resistance as the mast moves until the bridge is restored to balance. The potentiometer and coupling means at the mast are shown in FIG. 8 at 160.

The field coil and electrode arrangement shown in FIGS. 6 through 9 is effective in controlling arc flare from consumable electrodes by producing uniform electrode wear to thereby decrease furnace side wall erosion. The field coils are also effective in reducing electrode erosion and material loss from the arcing surface of the electrode.

There are basically two phases to the process of producing a typical heat from an electric furnace. The first phase is the melt down of the scrap which has been placed in the furnace. During this phase arc flare is desirable to melt more metal as the electrodes bore down in the scrap. The field coil is retracted to the top of the furnace and not used during this phase since the scrap itself shields the furnace wall from erosion. The second phase is the refining phase during which small amounts of unmelted material around the periphery of the furnace are melted, the bath is brought to temperature and alloy additions are made. During this latter phase the side walls are exposed to the arc and subject to heating and wear; the field coil is then used to control the arc position.

In general, the level of the bath is approximately the same from heat to heat and therefore the arcing tip of the electrodes will always be at approximately the same location with respect to the furnace wall. Since the electrodes may be longer or shorter because of different erosions, the mast and arm supporting the electrodes will very likely be at different positions with respect to the furnace. Therefore, locating the field coils with respect to the arc is best done by referencing it to the furnace itself.

In the apparatus of FIG. 7 a single mast and supporting arm positions all three field coils for the three electrodes. The arm is capable of retracting the field coils to the roof of the furnace during the first phase of operation, then lowering the coils when arc control is desired. As previously stated, the actual positioning of the field coil mast 118 can be done by any of conventional methods for positioning electrodes, one of which is hydraulic, and can be matched to the particular furnace. As previously stated, an indicator on the panel indicates field coil position from a suitable transducer. It is to be noted that the field coil arm is spaced from the electrode support arm to allow for different electrode lengths to the bath; also the field coil support arm retracts high enough to clear the electrode arm in the fully retracted position.

As previously stated, one of the objects of the invention is to prevent arc flaring toward the inside wall of the furnace in a manner to damage the wall. My invention employs a double approach: I prevent the electrode wearing off in a manner indicated by the prior art FIG. 1, which wearoff enhances arc flaring, by employing a magnetic field component transverse to the axially extending arc which exerts a force on the arc and causes the arc to move in a path around the electrode which produces substantially even wear around the entire periphery. I also utilize the arc focusing effect of the axial component of the magnetic field, which focusing effect tends to prevent arc flaring. My magnetic field coil is so spaced from the end or arcing surface of the electrode to provide both these field components. To increase the axial field component, the magnetic field coil is moved farther away or back from the tip and the current in the field coil is increased thereby increasing the strength of the axial field component relative to the strength of the transverse field component.

My invention has been described with reference to a carboniferous electrode, graphite. Graphite electrodes are in wide use because in many applications the material of the electrode, when some of it gets into the melt, does not contaminate the melt. Furthermore, graphite has a high melting point, relatively low electrical resistance and a relatively low erosion rate. My invention includes an electrode composed of any suitable material, including materials especially selected to be noncontaminating to the melt they are to be employed with.

The foregoing drawings and written description are exemplary and illustrative only and are not to be interpreted in a limiting sense.

I claim as my invention:

1. In combination in an electrode apparatus adapted for use in a furnace at substantially atmospheric pressure, an elongated electrode composed of a suitable material adapted to be connected to a source of potential and to have a generally axially extending electric arc produced from one arcing end thereof to a nearby surface of opposite polarity, fluid cooled magnetic field producing means including a fluid cooled magnetic field coil and a fluid cooled magnetic field coil housing therefor disposed in predetermined axially adjustable position along the length of the electrode and setting up a magnetic field at the arcing surface having a substantial component transverse to the arc path which causes the arc from the arcing end of the electrode to move substantially continuously over the electrode surface in a substantially circular closed path and having an axial component which focuses the arc thereby preventing arc flare, and means secured to the fluid cooled magnetic field coil housing and extending to a remote position for periodically adjusting the axial position of the coil housing and field coil as the material of the electrode is consumed by arc action thereon.

2. Apparatus according to claim 1 in which the electrode is additionally characterized as being solid and as being substantially circular in cross-section, and the fluid cooled means for setting up a magnetic field is additionally characterized as being disposed around the outer wall surface of the electrode near the arcing end at a selected distance from the arcing surface in accordance with the desired relative strengths of the transverse and axial field components.

3. Apparatus according to claim 1 in which the electrode is additionally characterized as being hollow and substantially cylindrical in shape, and the fluid-cooled magnetic field producing means is additionally characterized as having an axial length short relative to the diameter of the electrode and being disposed within the electrode near the arcing end.

4. Apparatus according to claim 1 in which the material of the electrode is additionally characterized as being graphite.

5. Magnetic field producing means for use with a solid electrode substantially cylindrical in cross-section composed of graphite or other suitable material and adapted to be connected in an electrical circuit to produce an arc from one end thereof comprising, in combination, annular fluid cooled housing means having at least one fluid passageway therein extending therearound and adapted to be slid over the end of the electrode and to be moved to a predetermined position near the arcing end of the electrode, an annular fluid cooled coil disposed within the housing means, the housing means being composed of substantially nonpermeable material having a high thermal conductivity, electrical insulating means interposed between the coil and the housing means, means for energizing the coil to set up a field which causes the arc to move substantially continuously in repetitive generally annular paths around the end of the electrode, and extended means for supporting the housing means in predetermined position along the length of the electrode, said extended means including means forming a fluid inlet passageway and a fluid outlet passageway both opening into the passageway in the housing means for the flow of cooling fluid to and from the housing means, the axial length of the coil being short relative to the diameter of the electrode.

6. Magnetic field producing means according to claim 5 further characterized as including annular fluid channeling and supporting means composed of nonpermeable material, in which said annular housing means is composed of material having high thermal conductivity, is generally U-shaped in cross-section and is mounted on the fluid channeling and supporting means, the U-shaped housing means having a plurality of U-shaped passageways at spaced intervals around the periphery thereof, fluid inlet header and fluid outlet header means extending around the entire periphery of the supporting means and communicating with all of said U-shaped fluid passageways, the extended means providing said fluid inlet and said fluid outlet passageways opening into the passageways in the housing means by way of said fluid inlet header and said fluid outlet header in the fluid channeling and supporting means.

7. Apparatus according to claim 5 wherein the coil is additionally characterized as being composed of conduit having a passageway extending therethrough for the flow of cooling fluid within the coil.

8. Apparatus according to claim 5 additionally characterized in that the field coil is electrically connected in series with the electrode whereby the arc current flows through the field coil.

9. Apparatus according to claim 5 in which the electrode is additionally characterized as being composed of graphite.

10. Electrode apparatus for use in a furnace in a melting operation including as a first phase the melt down of scrap which has been placed in the furnace during which phase arc flare is desirable to melt more metal as the electrode bores down into the scrap, and a second phase during which small amounts of unmelted material around the periphery of the furnace are melted and the bath is brought to temperature during which last-named phase the furnace side walls are exposed to the arc and arc flare toward the wall of the furnace is undesirable and damages the furnace wall, comprising in combination, an electrode composed of carboniferous or such like material extending into the furnace, electrical circuit means for causing an arc from the electrode to the material in the furnace, magnetic field coil means slidable with respect to the electrode and including a coil for setting up a magnetic field at the arcing surface of the electrode which has a field component transverse to the arc path which sets up a force on the arc which causes the arc to move substantially continuously in a generally annular path around the arcing surface of the electrode thereby preventing the arcing surface from becoming skewed or slanting as a result of the arc therefrom thereby reducing the tendency of the arc to flare from the electrode toward the wall of the furnace, the magnetic field coil also setting up a magnetic field having a component lying in an axial direction, said last-named component having a focusing effect on the arc thereby preventing the arc from flaring toward the furnace wall, the relative strengths of the transverse and axial field components depending upon the distance of the field coil from the arcing surface, and means for adjusting the position of the field coil to produce transverse and axial field components which result in a minimum flaring of the arc, said last-named means including means for elevating the field coils toward the top of the furnace during said first phase in which arc flaring is desirable.

11. Apparatus according to claim 10 in which the magnetic field coil means includes a plurality of tubes secured to the field coil, said tubes extending parallel to the axis of the electrode, said tubes bringing an energizing current to the field coil, and movable mounting means extending outside the furnace attached to said tubes for slidably positioning the field coil with respect to the electrodes.

12. Apparatus according to claim 11, in which the electrode has an arm secured thereto for holding the electrode in position in the furnace, said arm including means for axially adjusting the position of the electrode as the electrode is consumed during the melting operation, said arm having at least a pair of passageways therethrough, said tubes to the field coil passing through said passageways whereby the arm does not obstruct the movement of the tubes, said movable mounting means having variable force applying means operatively connected thereto for moving the arms and the field coils up and down on the electrode.

13. Apparatus according to claim 12 in which the field coil is additionally characterized as being fluid cooled, and said tubes bring fluid to the coil and conduct fluid from the coil as well as providing electrical circuit means for bringing an energizing current to the coil.

14. Apparatus according to claim 13 in which the force applying means connected to the movable means for the coil and tubes is a hydraulic cylinder having a piston mast secured to the movable means.

15. Apparatus according to claim 14 including electrical circuit means for controlling the piston of the field coil, said electrical circuit means including a null type bridge servo circuit including a manually adjustable mast to a height setting by the operator of the apparatus, a transducer operatively connected to the piston rod mast and responsive to movement of the rod in either direction, and "lower coil" and "raise coil" controls and a pair of oppositely poled rectifiers connecting the "raise coil" and "lower coil" controls to receive the output of the bridge, adjustment of the control arm creating an unbalance of the bridge and creating a potential which is selectively applied by way of one of said oppositely poled rectifiers to the associated control to energize the control and move the piston rod and coils to a position whereat the bridge is balanced.

16. Apparatus according to claim 10 including two other similar electrodes each having similar field coil means, and the electrical circuit means is a three phase alternating current source for producing three arcs from the three electrodes to the melt.

17. Apparatus according to claim 12 in which the passageways through the arm which supports the electrode include in addition sleeves of insulating material disposed therein through which sleeves the tubes to the field coil pass to provide electrical insulation between the tubes and the arm supporting the electrode.

18. In combination in electrode apparatus adapted for use in a furnace at substantially atmospheric pressure, an elongated electrode composed of a suitable material adapted to be connected to a source of potential and to have a generally axially extending electric arc produced from one arcing end thereof to a nearby surface of opposite polarity, an outer generally U-shaped annular member composed of material having high thermal conductivity encircling the electrode at an axially adjustable position thereon, an electrically insulating jacket enclosing the exposed surface of the outer U-shaped annular member, an additional inner U-shaped annular member disposed within the outer annular U-shaped member, the inner U-shaped annular member having a plurality of U-shaped passageways at spaced intervals around the entire circumference thereof, the U-shaped passageways providing passageways for the flow of cooling fluid to conduct heat flux therefrom, annular supporting and fluid channeling means supporting the outer and inner U-shaped annular members and including fluid inlet header means and fluid outlet header means both communicating with all of the U-shaped passageways, extended means for mounting and securing the supporting and fluid channeling means at a selected position along the length of the electrode, the extended means including means forming fluid flow passageways for bringing fluid to and from the U-shaped passageways, a magnetic field coil disposed within the inner U-shaped annular member, the field coil being composed of hollow conduit having a passageway therethrough, means for causing a cooling fluid to flow through the passageway of the hollow conduit, and means for energizing the field coil to set up a magnetic field to cause the arc from the electrode to rotate around the arcing end of the electrode in repetitive paths.

References Cited

UNITED STATES PATENTS

| | | | |
|---|---|---|---|
| 430,453 | 6/1890 | Willson | 75—10 |
| 1,964,832 | 7/1934 | Soulary | 13—18 |
| 2,040,215 | 5/1936 | Rava | 13—34 |
| 2,286,210 | 6/1942 | Klemperer et al. | 219—97 |
| 2,472,851 | 6/1949 | Landis et al. | 315—347 |
| 3,226,223 | 12/1965 | Bussard et al. | 75—10 |

BERNARD A. GILHEANY, Primary Examiner

R. N. ENVALL, Jr., Assistant Examiner

U.S. Cl. X.R.

13—34